(12) United States Patent
    Domingues Dos Santos et al.

(10) Patent No.: US 12,589,364 B2
(45) Date of Patent: Mar. 31, 2026

(54) ELECTROSTATICALLY CHARGED POROUS NONWOVEN WEB, MEMBRANE AND MASK DERIVED THEREFROM AND METHODS FOR MANUFACTURE AND CLEANING

(71) Applicant: ARKEMA FRANCE, Colombes (FR)

(72) Inventors: Fabrice Domingues Dos Santos, Colombes Cedex (FR); Anthony Bonnet, Colombes Cedex (FR)

(73) Assignee: ARKEMA FRANCE, Puteaux (FR)

( * ) Notice: Subject to any disclaimer, the term of this patent is extended or adjusted under 35 U.S.C. 154(b) by 685 days.

(21) Appl. No.: 18/002,156

(22) PCT Filed: Jun. 17, 2021

(86) PCT No.: PCT/FR2021/051088
    § 371 (c)(1),
    (2) Date: Dec. 16, 2022

(87) PCT Pub. No.: WO2021/255390
    PCT Pub. Date: Dec. 23, 2021

(65) Prior Publication Data
    US 2023/0226501 A1       Jul. 20, 2023

(30) Foreign Application Priority Data

Jun. 19, 2020    (FR) ..................................... 2006468
    Jun. 19, 2020    (FR) ..................................... 2006469
                    (Continued)

(51) Int. Cl.
    B01D 71/34        (2006.01)
    B01D 65/02        (2006.01)
                    (Continued)

(52) U.S. Cl.
    CPC ........... B01D 71/34 (2013.01); B01D 65/022 (2013.01); B01D 69/02 (2013.01);
                    (Continued)

(58) Field of Classification Search
    CPC ........ B01D 65/02; B01D 69/02; B01D 69/10; B01D 71/34; B01D 71/40; B32B 5/02; B32B 5/26; D04H 1/4318; D04H 1/724
    See application file for complete search history.

(56) References Cited

U.S. PATENT DOCUMENTS

| | | | | |
|---|---|---|---|---|
| 9,327,247 B2 * | 5/2016 | Kosar | ................ | B01D 71/4011 |
| 2019/0262777 A1 * | 8/2019 | Querzé | ............. | B01D 67/0016 |
| 2019/0314746 A1 | 10/2019 | Leung | | |

FOREIGN PATENT DOCUMENTS

CN        105688349 A        6/2016

OTHER PUBLICATIONS

First Office Action mailed on Apr. 10, 2024, by the China National Intellectual Property Administration for Chinese Application No. 202180050987, 11 pages.

(Continued)

*Primary Examiner* — Sharon Pregler
(74) *Attorney, Agent, or Firm* — Boone IP Law

(57) ABSTRACT

A nonwoven web obtained by electrospinning, suitable for the filtration of nano- and/or submicron aerosols, including a multiplicity of fibers of composition C1, the composition C1 including at least 50% by weight of at least one polymer P1 based on the repeat unit resulting from vinylidene fluoride (VDF), the fibers of composition C1 having a degree of crystallinity in polar phase(s), preferentially in solely beta phase, of at least 65% by weight, with respect to their total weight. Also, a process for the manufacture of the web, to a membrane including the web and also to a process for the washing/sterilization of the web or of the membrane.

19 Claims, 3 Drawing Sheets

(30)      Foreign Application Priority Data

Jun. 19, 2020   (FR) ...................................... 2006471
Jun. 19, 2020   (FR) ...................................... 2006472

(51) Int. Cl.
| | |
|---|---|
| *B01D 69/02* | (2006.01) |
| *B01D 69/10* | (2006.01) |
| *B01D 71/40* | (2006.01) |
| *B32B 5/02* | (2006.01) |
| *B32B 5/26* | (2006.01) |
| *D04H 1/4318* | (2012.01) |
| *D04H 1/724* | (2012.01) |

(52) U.S. Cl.
CPC ...... *B01D 69/1071* (2022.08); *B01D 71/4011* (2022.08); *B32B 5/022* (2013.01); *B32B 5/266* (2021.05); *D04H 1/4318* (2013.01); *D04H 1/724* (2013.01); *B01D 2321/32* (2013.01); *B01D 2325/52* (2022.08); *B32B 2250/20* (2013.01); *B32B 2262/0238* (2013.01); *B32B 2571/00* (2013.01); *D10B 2505/04* (2013.01)

(56)            References Cited

OTHER PUBLICATIONS

"Electrically activated ultrathin pvdf-trfe air filter for high-efficiency pm 1.0 filtration", Han Kyung seok, et al., Advanced functional material, Jul. 15, 2019, vol. 218, No. 37, pp. 1-7.
International Search Report (PCT/ISA/210) with translation and Written Opinion (PCT/ISA/237) mailed on Oct. 15, 2021, by the European Patent Office as the International Searching Authority for International Application No. PCT/FR2021/051088. (16pages).

* cited by examiner

[Fig. 1]
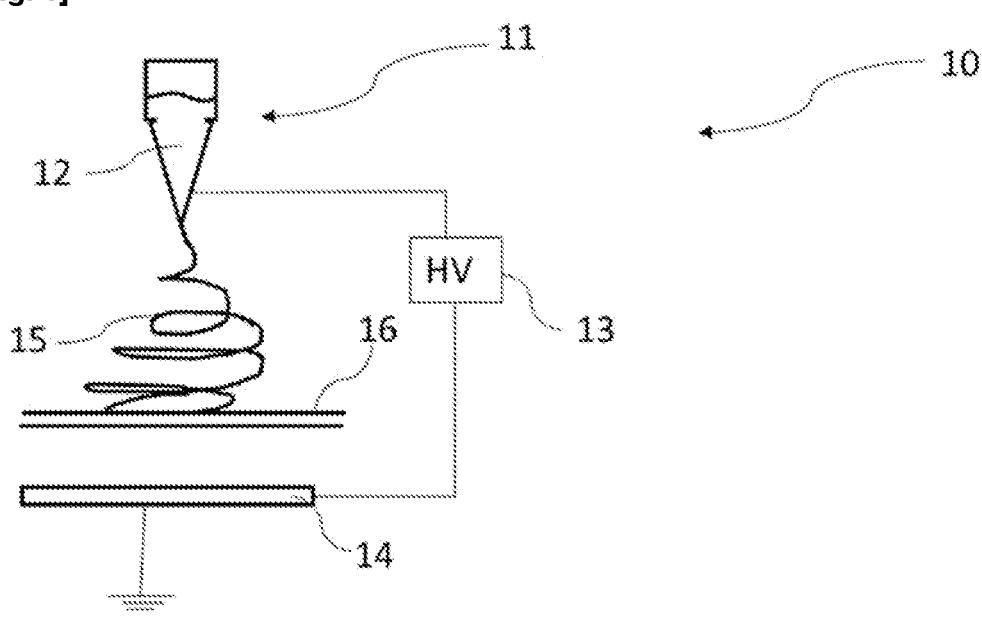
[Fig. 2]
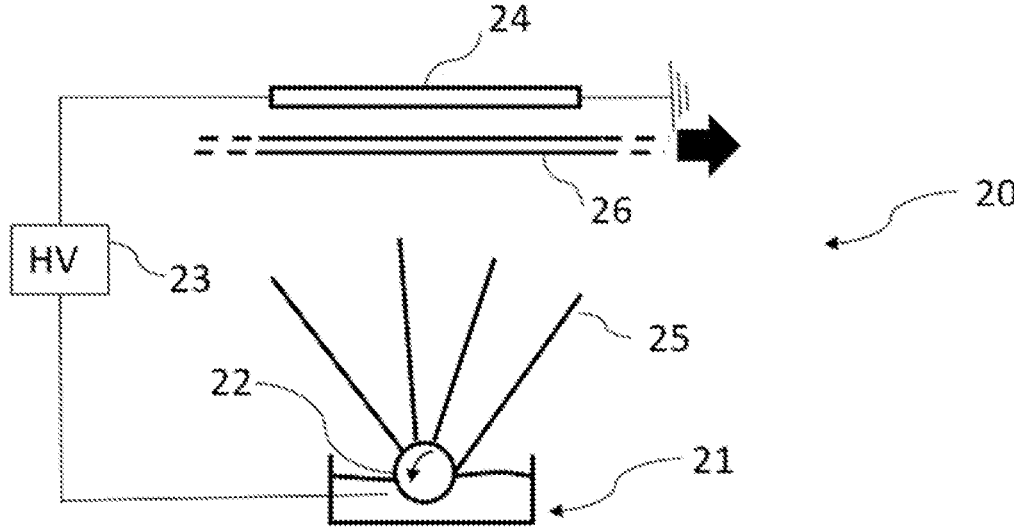

[Fig. 3]
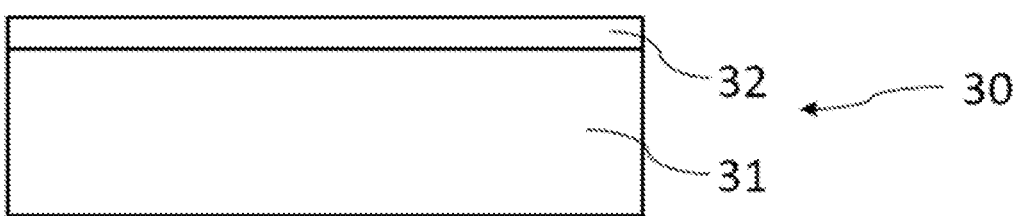
[Fig. 4]
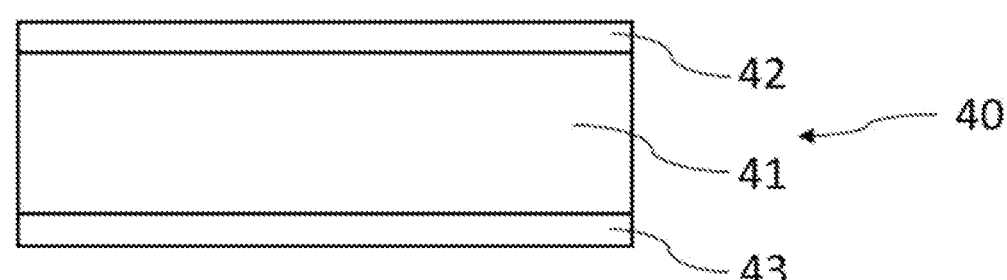
[Fig. 5]
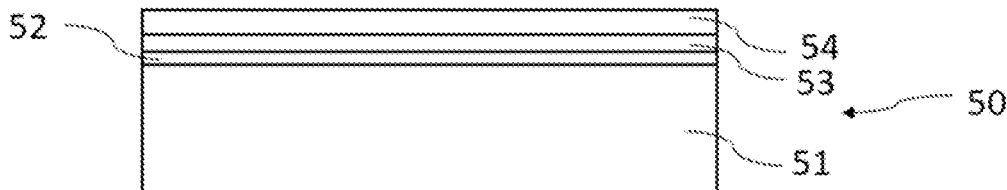

[Fig. 6]
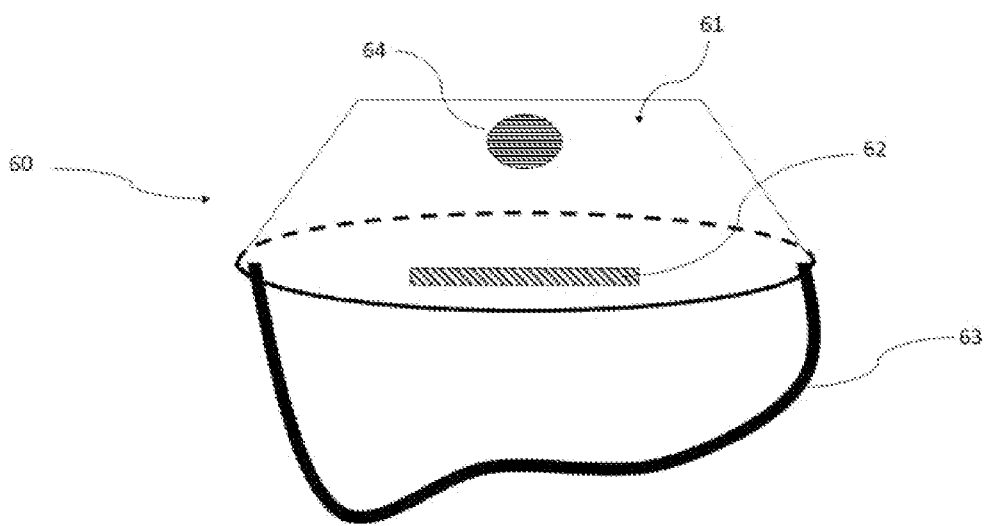
[Fig. 7]
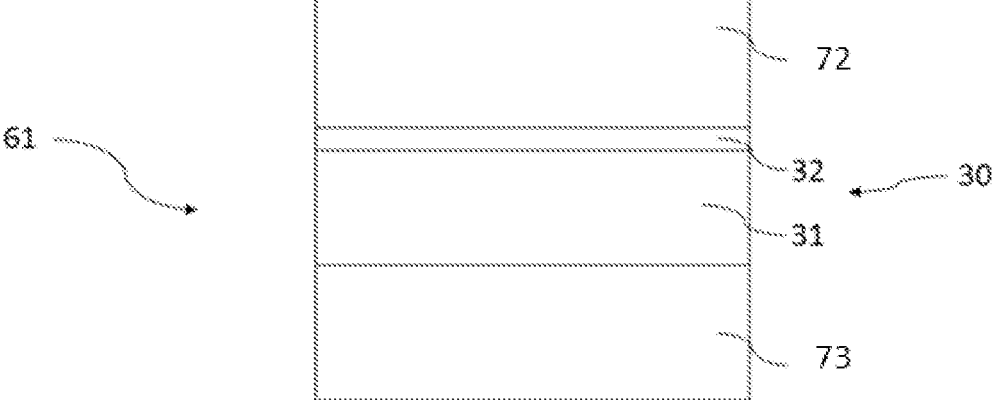

ELECTROSTATICALLY CHARGED POROUS NONWOVEN WEB, MEMBRANE AND MASK DERIVED THEREFROM AND METHODS FOR MANUFACTURE AND CLEANING

TECHNICAL FIELD

The invention relates to the field of porous webs of fibers based on fluoropolymer(s) and of membranes deriving therefrom.

In particular, the invention relates to such webs for the filtration of nano- and/or submicron aerosols comprising a set of fibers based on fluoropolymer. The invention also relates to the use of such webs, or of membranes deriving therefrom, in air filtration devices, in particular in respiratory protection filtering apparatuses.

The invention also relates to a process for implementing these webs and/or these membranes.

The invention finally relates to a process for cleaning these webs and/or these membranes.

PRIOR ART

In the context of the health crisis linked to the Coronavirus Covid-19, it has proved particularly important to develop and produce air filtration devices, in particular respiratory protection filtering apparatuses (masks for medical use, FFP-type masks, cartridge masks with or without assisted ventilation) or other apparatuses intended for air filtration, which are more efficient, effective, durable, and guarantee the good safety and the good health of users. With regard to respiratory protection filtering apparatuses, it has also proved important for the latter to be sufficiently comfortable for their user ("good breathability") and reusable.

A key element of air filtration devices, in particular respiratory protection filtering apparatuses, is the presence of one or more porous membranes composed of nonwoven fibers. These membranes ensure the blocking of potentially harmful aerosols comprising small-sized particles, such as bacteria or even viruses. Several processes are known for producing such membranes, where nonwoven fibers are or are not deposited on a porous substrate. In particular, processes are known which start from polymer films (for example: film grinding or carding), from polymers melted by blowing (for example: meltblown), or from polymers in solution (for example: solution electrospinning) (see: Irwin M. Hutten, in Handbook of Nonwoven Filter Media (Second Edition)).

These processes can be combined with processes making it possible to electrostatically charge the nonwovens, by plasma treatment, and in particular by direct current corona treatment, by friction (triboelectric effect), by wet steam or also by dry steam.

A membrane having fibers, the surface of which is electrostatically charged, will have the ability to block polluting or infectious elements by the electrostatic effect, and will thus have an improved filtration efficiency compared to an uncharged membrane.

The membranes are generally composed from synthetic fibers or from combinations of synthetic fibers obtained from thermoplastic polymers, such as, without being exhaustive: polyolefins, polyamides, polyvinyls, polyimides, polyacrylates, polymethacrylates, polyurethanes or also fluoropolymers, and in particular polyvinylidene fluoride. The most widely used polymers to date are polyolefins and in particular polypropylene.

Usually, three main physical mechanisms are singled out by which a filter element makes it possible to limit the passage of aerosols carried by a gas stream. Two are related to mechanical effects, the third to electrostatic effects. The first effect, "impact", is that observed when particles have dimensions close to that of the size of the pores, and are thus blocked by impact with the fibers. The second effect, "diffusion", is related to the fact that the scattering particles have a Brownian component in their movement and are thus liable to come into contact with and to adhere to the fibers. This mechanism makes it possible to prevent the passage of particles with sizes which are smaller than the dimension of the pores.

The third effect, "induction", is associated with electrostatic phenomena. If the particles to be filtered are charged or polarizable, they are liable to be attracted by fibers themselves having charges or dipoles. This third effect makes it possible to limit the passage of particles, the dimensions of which are significantly smaller than the size of the pores. It becomes all the more marked as the diameter of the fibers decreases.

In addition, in order to evaluate the performance quality of a membrane, several criteria are commonly used and in particular: the efficiency, the pressure drop and also the quality factor.

The efficiency, $\eta(t)$, is the ability of the membrane to block harmful aerosols. It is evaluated by the difference in concentration of the pollutant upstream and downstream of the filter element according to the following formula:

$$\eta(t) = \frac{c_{in} - c_{out}}{c_{in}}, \qquad \text{[Math 1]}$$

in which $C_{in}$ and $C_{out}$ are the concentrations of pollutants specifically identified as having to be filtered upstream or downstream of the filter element. The characteristics of the pollutants specifically studied are generally defined by the upper ranges of sizes of particles which it is desired to remove. The aim will generally be to have maximum efficiency which deteriorates as little as possible as a function of time, temperature, humidity, in more or less aggressive environments, or during stages of treatment, decontamination and/or regeneration of the membrane.

The efficiency $\eta(t)$ can be expressed according to two components according to the following formula:

$$\eta(t) = \eta \cdot (m(t) + e(t)),$$

in which m(t) is the component related to the mechanical effects and e(t) is the component related to the electrostatic effects.

It is easy to understand that, when the characteristic dimensions of the pores decrease, the mechanical component of the efficiency increases and thus the efficiency of the filter element also.

The pressure drop, $\Delta P$, is the pressure difference between the upstream and downstream of the filter element through which a gas stream comprising or not comprising the polluting elements passes. It thus characterizes the ability of a gas, such as air, to pass through the filter element. In general, the aim will be to have the lowest possible pressure drop, in particular for the filter elements entering respiratory protection filtering apparatuses, without assisted ventilation, because an excessively large pressure drop causes difficulties in being able to breathe without assistance through the mask.

It is thus generally not desirable to excessively reduce the characteristic dimensions of the pores and/or the porosity in order not to excessively increase the pressure drop of the filter element.

The quality factor, $Q_f(t)$, is defined by the formula:

$$Q_f(t) = -\frac{\ln(1 - \eta(t))}{\Delta P(t)}, \qquad \text{[Math 3]}$$

in which $\eta(t)$ and $\Delta P$ are respectively the efficiency and the pressure drop, as defined above.

The quality factor makes it possible to evaluate overall the performance qualities and the possibilities of use of a filter, by balancing its effectiveness in filtering particles of given dimensions, and its pressure drop, thus its ability to allow a gas stream to circulate, and in particular inhaled air or exhaled carbon dioxide. It is well understood that the quality factor depends on an optimization of the characteristic size of the pores, the porosity (volume of the filter element not filled by the fibers) and electrostatic efficiency. The aim will be to increase the efficiency by having pores small enough to block polluting or infectious particles but large enough to make possible a low pressure drop. The aim will likewise be to maximize the electrostatic effect which makes it possible to increase the size of the pores while making possible high efficiency, and the aim will be to minimize the diameter of the fibers in order to make possible the formation of small pores while retaining a high porosity. This compromise is all the more difficult to achieve when the particles which it is desired to filter are of small sizes. This is particularly the case for the filtration of viruses, which have a characteristic size of the order of 100 nm or a few hundred nanometers. A process particularly suited to the production of porous nonwoven membranes for protection against viruses is the process for the electrospinning of polymers in solution. In this process, a solution containing the formulation of polymer and of additives in a formulation of suitable solvents is forced through a narrow needle-shaped die or nozzle. This die is brought to a high electrical potential (positive or negative), generally of the order of several kilovolts, or tens of kilovolts. When the solution is sufficiently polar and/or conductive, the electrostatic charges generated in the solution by the field will compensate for the surface tension forces, forcing the drops of fluid to stretch. As the solvent evaporates virtually completely, indeed even completely, solid fibers will be formed and will be deposited on a collector connected to an electrical ground. The set of fibers can thus form a porous nonwoven membrane. This process makes it possible to produce fibers of variable dimensions, and in particular fibers, the diameter of which has an order of magnitude of ten or a hundred nanometers, which processes such as conventional fusion processes cannot do. It is known in the prior art, for example in US2019/0314746, to obtain a porous nonwoven PVDF web by an electrospinning process, suitable for air filtration. More specifically, US2019/0314746 describes the process for the electrospinning of a solution of PVDF, the PVDF used having a molecular weight of 530 000, at 20% w/v (weight per volume) in a mixture of DMF/acetone solvents in proportions of 8/2 (v/v), at a voltage of 20 kV. The nanofibers are electrospun onto the surface of a drum covered with a nonwoven polypropylene (PP) substrate. Once the electrospinning of the nanofibers is complete, the membrane formed by the web of PVDF on its PP substrate is dried at 40° C. in a vacuum oven in order to remove as much as possible of the residual solvent.

The dried membrane is subsequently polarized by corona in order to fully charge the electrets. The set of PVDF fibers in the membrane has a distribution of diameters with a median diameter of 450 nm.

Solution electrospinning makes it possible to obtain, under certain conditions, fibers having diameters small enough for good breathability and good mechanical filtration efficiency of the membrane for air filtration. Poly(vinylidene fluoride), more commonly known as PVDF, makes it possible to obtain hydrophobic and chemically resistant membranes. PVDF is a semicrystalline thermoplastic polymer which exhibits a polymorphism, namely that it can crystallize under different crystalline phases: $\alpha$, $\beta$, $\gamma$ and $\delta$. The sequence of conformations, trans (T) or gauche (G), along the chains and also the arrangement of the chains between themselves in the crystal (symmetry) define the phase and also its polar or nonpolar nature.

The alpha phase can be described by sequences of TGTG (Trans Gauche+Trans Gauche−) conformation. This is the only nonpolar phase.

The beta phase can be described by sequences of solely "trans" (T) conformations along the chains, themselves arranged in a noncentrosymmetric orthorhombic unit cell. The beta phase is the most polar phase.

There exist intermediates between the alpha phase and the beta phase, in particular the gamma phase, which can be described by sequences of $T_3GT_3G$ conformation. It is polar but much less than the beta phase. The delta phase is also polar but has been studied only to a minor extent.

The polar phases, in particular the most polar beta phase, exhibit important ferroelectric properties. This means that the application to the material of an electric field at a value greater than a characteristic field called a coercive field (Ec) makes possible the orientation of the dipoles formed by the C—F bonds in the same direction. This orientation of the dipoles, sufficiently stable over time as a result of ferroelectric properties, gives the material a remanent polarization at zero electric field. Thus, the presence of beta phase in the PVDF fibers is particularly advantageous for air filtration applications because this makes it possible to generate charges bonded to the material and thus to increase the electrostatic efficiency (greater electrostatic efficiency compared to fibers of nonferroelectric dielectric materials).

The electrospinning of solutions of PVDF in dimethylformamide (DMF) is known from Andrew et al. (see: *Effect of electrospinning on the ferroelectric phase content of polyvinylidene difluoride fibers*, Langmuir, 2008, Vol. 24, No. 3, pp. 670-672). By varying certain parameters of the process, in the case in point the concentration of PVDF in the solution and the voltage applied during electrospinning, the authors manage to obtain a web of PVDF fibers having a crystallinity of 49% to 58%, the percentage of beta phase in the crystalline phase being at most 75%. Thus, the fibers obtained have a content of beta phase of 37% to 47% by weight, with respect to the weight of fibers.

The electrospinning of solutions of PVDF at a concentration of 20% by weight in DMF is known from Baqueri et al. (see: *Influence of processing conditions on polymorphic behavior, crystallinity, and morphology of electrospun poly(vinylidene fluoride) nanofibers*, Journal of Applied Polymer Science, 2015, Vol. 132, No. 30). The authors manage to obtain, with an electrospinning flow rate of 0.5 ml/h and an applied voltage during the electrospinning of 13 kV, a web of PVDF fibers having a crystallinity of 53%, the percentage of beta phase in the crystalline phase being at most 83%.

Thus, the fibers obtained have a content of beta phase of 44% by weight, with respect to the weight of fibers. Moreover, their median diameter is 55 nm.

There exists a need to provide webs of fibers having a greater proportion of beta phase with respect to the weight of fibers, in order to improve the ferroelectric properties of the web.

Furthermore, due to the limited solubility of PVDF in a small number of generally quite toxic solvents, such as DMF, the implementation of a process for the electrospinning of PVDF fibers in solution can be quite tedious due to the handling of large amounts of these solvents. Furthermore, it should not be neglected, in certain cases at least and to a certain extent, that these solvents can remain impregnated in the PVDF fibers. This poses potential problems of health and safety for users, in particular if the membranes are used to manufacture respiratory protection filtering apparatuses. There thus exists a need to be freed from the use of toxic solvents, or at the very least to use less toxic solvents, in order to manufacture a web of fluoropolymer and/or a membrane deriving therefrom.

In addition, it is preferable, because of the risks of toxicity of nano-objects to humans, for the web and/or the membrane deriving therefrom not to contain or to contain only very few fibers with a diameter of less than or equal to 0.1 µm. It is thus advisable to develop webs and/or membranes deriving therefrom, the electrostatic component of the efficiency of which is improved so as to possibly compensate for a loss of mechanical efficiency due to the use of fibers having a diameter of greater than 0.1 µm.

Objectives

The objective of the invention is to provide a web and/or a membrane for the filtration of nanometer and/or submicron aerosols meeting at least one of the abovementioned needs.

One objective of the invention is to provide, at least according to certain embodiments, a web and/or a membrane suitable for air filtration, the fibers of which have improved ferroelectric properties.

Another objective of the invention is to provide, at least according to certain embodiments, a web and/or a membrane suitable for the filtration of an air intended to be breathed, and thus not presenting any toxicological danger to human health.

Another objective of the invention is, at least according to certain embodiments, to propose a web and/or a membrane intended to be used as filtering part of a respiratory protection filtering apparatus.

Another objective of the invention is to provide, at least according to certain embodiments, a web and/or a membrane for the filtration of air which, for a given pressure drop, has an improved efficiency.

Another objective of the invention is to provide, at least according to certain embodiments, a web and/or a membrane for the filtration of air which, for a given efficiency, has a reduced pressure drop.

Another objective of the invention is to provide, at least according to certain embodiments, a web and/or a membrane for the filtration of air, the electrostatic efficiency of which is/are "durable", that is to say having a low impact on the environment. In particular, one objective is to provide a web and/or a membrane for air filtration which can be reused after cleaning and/or sterilization.

Other objectives arising directly from the abovementioned objectives are in particular:

to provide a process for the manufacture of the web and/or of the membrane;

to provide a filter comprising the web and/or the membrane and also any assembly on which the filter can be fitted removably or nonremovably;

to provide a process for washing and/or sterilizing the web and/or the membrane, a filter deriving therefrom, indeed even an assembly on which the filter is fitted removably or nonremovably.

SUMMARY OF THE INVENTION

The invention relates to a nonwoven, porous and electrostatically charged web, suitable for the filtration of nano- and/or submicron aerosols. It comprises a multiplicity of fibers of composition C1. The composition C1 comprises at least 50% by weight of at least one polymer P1 based on the repeat unit resulting from vinylidene fluoride (VDF). The fibers of composition C1 have a degree of crystallinity in polar phase(s), preferentially in solely beta phase, of at least 65% by weight, with respect to their total weight.

Thus, the web according to the invention, as a result in particular of better ferroelectric properties, has an improved electrostatic efficiency. According to certain embodiments, the fibers of composition C1 have a degree of crystallinity in polar phase(s), preferentially in solely beta phase, of at least 75%, or of at least 80%, or of at least 85%, or of at least 90%, or of at least 95%, or of at least 96%, or of at least 97%, or of at least 98%, or of at least 99%, by weight, with respect to their total weight.

According to certain embodiments, the polymer P1 is chosen from the group consisting of: a homopolymer of VDF; a copolymer having a repeat unit resulting from VDF and at least one repeat unit resulting from a monomer other than VDF, the other monomer being chosen from the list consisting of: vinyl fluoride (VF), tetrafluoroethylene (TFE), trifluoroethylene (TrFE), a chlorofluoroethylene (CFE), a chlorodifluoroethylene, chlorotrifluoroethylene (CTFE), dichlorodifluoroethylene, a trichlorofluoroethylene, hexafluoropropylene (HFP), a trifluoropropene, a tetrafluoropropene, a chlorotrifluoropropene, hexafluoroisobutylene, perfluorobutylethylene, a pentafluoropropene, a perfluoroether, in particular a perfluoroalkyl vinyl ether, ethylene, an acrylic monomer, a methacrylic monomer and their mixture; and a mixture of homopolymer(s) and copolymer(s).

According to certain embodiments, the polymer P1 is a PVDF, a P(VDF-HFP), a P(VDF-TFE), a P(VDF-TrFE) or their mixture.

According to certain embodiments, said at least one polymer P1 is a mixture consisting of:

a PVDF, a copolymer chosen from: P(VDF-HFP), P(VDF-TFE) and P(VDF-TrFE);

the proportion by weight of PVDF, with respect to that of the copolymer, ranging from 1:99 to 99:1, preferentially from 10:90 to 90:10 and extremely preferentially from 25:75 to 75:25.

According to certain embodiments, the polymer P1 represents at least 60%, or at least 70%, or at least 80%, or at least 90%, or at least 95%, or at least 97.5%, or at least 99.0%, by weight, of the composition C1.

According to certain embodiments, the composition C1 additionally comprises at least one polymer P1' chosen from the list consisting of: a poly(methyl methacrylate) (PMMA), a poly(ethyl methacrylate) (PEMA), a poly(methyl acrylate) (PMA), a poly(ethyl acrylate) (PEA), a poly(vinyl acetate) (PVAc), a poly(vinyl methyl ketone) (PVMK), a thermoplastic polyurethane (TPU), a thermoplastic starch, copolymers deriving therefrom, and their mixtures. According to certain embodiments, the polymer P1 consists of a PVDF and the polymer P1' consists of a PMMA, the proportion by weight of P1', with respect to the sum of the weights of the polymers P1 and P1', being from 15% to 40%, preferentially from 16% to 30% and extremely preferentially from 17% to 23%. According to certain embodiments, the web according to the invention consists of fibers of composition C1.

According to certain embodiments, the web has a weight per unit area of 0.01 g/m$^2$ to 3 g/m$^2$, preferentially of 0.02 g/m$^2$ to 1 g/m$^2$ and extremely preferentially of 0.03 g/m$^2$ to 0.5 g/m$^2$.

According to certain embodiments, the web comprises less than 1%, preferentially less than 0.5% and more preferably less than 0.1% by number of fibers having a diameter strictly of less than 100 nm.

The invention also relates to a process for the manufacture of a nonwoven, porous and electrostatically charged web, suitable for the filtration of nano- and/or submicron aerosols, the web being according to the embodiments described above. The process comprises:

the provision of at least one composition C1, said composition C1 comprising at least 50% by weight of at least one polymer P1 based on a repeat unit resulting from VDF;

a stage of formation of the web by electrospinning the composition C1.

The invention additionally relates to a membrane suitable for the filtration of nano- and/or submicron aerosols comprising:

at least one web according to the embodiments described above; and a support layer supporting said web.

According to certain embodiments, the web within the membrane has a weight per unit area of 0.01 g/m$^2$ to 3 g/m$^2$, preferentially of 0.02 g/m$^2$ to 1 g/m$^2$ and extremely preferentially of 0.03 g/m$^2$ to 0.5 g/m$^2$.

According to certain embodiments, the support layer is a nonwoven set of fibers chosen from: polyolefins, such as a polyethylene (PE) or a polypropylene (PP), polyesters, such as a poly(ethylene terephthalate) (PET), a poly(butylene terephthalate) (PBT) or also a poly(ethylene naphthalate) (PEN), polyamides or copolyamides, such as a PA 11, a PA 12, a PA 6, a PA 6.6 or a PA 6.10, a polyacrylonitrile (PAN), fluoropolymers, such as a polyvinylidene fluoride (PVDF), a fluorinated ethylene propylene (FEP) or a polytetrafluoroethylene (PTFE), and their mixture.

Finally, the invention relates to a process for the washing/sterilization of a web according to embodiments described above or of a membrane according to embodiments described above comprising a stage of heat treatment carried out at a temperature of 40° C. to 90° C., preferentially of 55° C. to 85° C. and extremely preferentially at a temperature of 65° C. to 80° C.

FIGURES

FIG. 1 diagrammatically represents a first device for electrospinning ("with needle").

FIG. 2 diagrammatically represents a second device for electrospinning ("without needle").

FIG. 3 diagrammatically represents a membrane according to a first embodiment.

FIG. 4 diagrammatically represents a membrane according to a second embodiment.

FIG. 5 diagrammatically represents a membrane according to a third embodiment.

FIG. 6 diagrammatically represents a filtering half-mask comprising a membrane according to the invention.

FIG. 7 diagrammatically represents a possible architecture of the filter used in the half-mask according to FIG. 6.

DETAILED DESCRIPTION OF THE INVENTION

Web

The invention relates to a nonwoven, porous and electrostatically charged web, suitable for the filtration of nano- and/or submicron aerosols, comprising a multiplicity of fibers of composition C1. The composition C1 comprises at least 50% by weight of at least one polymer P1 based on a repeat unit resulting from VDF. The fibers of composition C1 have a degree of crystallinity in polar phase(s) of at least 65% by weight, with respect to the total weight of fibers. Advantageously, the beta phase is the predominant polar phase, that is to say that it represents more than 50% by weight of the polar phases. Preferably, the beta phase represents more than 80% or even more than 95% of the polar phases. In many cases, the gamma and/or delta phases are not detected, and it is then considered that the fibers consist solely of beta phase as polar crystalline phase.

The beta phase can be described by sequences of all-trans (T) conformations along the polymer P1 chains. It is the most polar phase among the different possible phases which the polymer P1 can adopt. Due to the presence of crystals in the beta-phase form, the polymer P1 is ferroelectric. It can be characterized by a hysteresis cycle of the electric displacement-applied electric field curve. Its coercive field at 25° C. is typically greater than or equal to 40 V/μm. Its remanent polarization at 25° C. is quite high and can typically reach a value of greater than 40 mC/m$^2$.

Thus, the fibers of the web according to the invention, in particular the fibers of composition C1, are polarizable at a relatively low coercive electric field and exhibit a relatively high remanent polarization. The polarized fibers form permanent dipoles which are stable over time and to humidity (hydrophobicity). The polarized fibers are also temperature stable. This makes it possible to envisage processes for washing/sterilizing the web and/or a membrane deriving therefrom and a reuse of these without significant loss of filtration efficiency. The term "porous" is understood to mean that the web exhibits a set of empty spaces called pores. The pores are advantageously mainly open pores, that is to say that they can be connected together to form very fine channels. This makes it possible to render the web and thus any membrane deriving therefrom permeable to air.

The expression "electrostatically charged" is understood to mean that the web has dipole charges and, if appropriate, space charges.

The term "aerosol" is understood to denote a suspension in a gas, in particular air, of solid and/or liquid particles exhibiting a negligible rate of fall. In air, at 25° C. and 1015 hPa, this generally corresponds to particles smaller than approximately 100 μm in size. Aerosol particles having their three external dimensions less than 1 micrometer (also called PM1) are described as submicron particles. Aerosol particles having their three external dimensions less than 100 nanometers are described as nanometric particles.

Submicron or nanometric aerosols encompass dusts, mists and fogs, and also bioaerosols.

Dusts, mists and fog can be emitted by automobile traffic (incomplete combustion) or certain industrial activities (particles of chemical and/or thermal origin, or secondary particles, formed during a change of state of matter, during a chemical reaction or during stages of condensation of gases or solidification of liquids).

Bioaerosols are aerosols containing living microorganisms (viruses, bacteria, molds and protozoa) or substances or products originating from these organisms (e.g.: toxins, dead microorganisms or fragments of microorganisms).

Bioaerosols are ubiquitous in the environment and in workplaces. They can originate from people, animals, plants and the material handled, or be generated by a process, for example. In the case of the Covid 19 virus, the virus can be present in the air in the form of droplets propelled by sneezing, coughing or sputtering or emitted by simple exhalations.

There exist various measurement methods, indirect (for example by sampling, measurement of concentration and microscopic observation) or direct (for example by electrical methods), well known to a person skilled in the art, in order to evaluate the concentration of particles and their particle size distribution in an aerosol.

Aerosols comprising NaCl particles with sizes ranging from 50 nm to 500 nm can advantageously be used to test the efficiency of the web or of a membrane deriving therefrom, against charges of bioaerosol type.

The term "fiber" is understood to denote a filamentous element, which can generally be described by a diameter and a length.

The term "nonwoven web of fibers" is understood to denote a set of fibers which is obtained in particular by assembling fibers, without weaving or knitting. An additional definition has been proposed by EDANA (European Disposal and Nonwoven Association), according to EN ISO 9092, as meaning made of a sheet of individual fibers, directly or randomly oriented, bonded by friction, cohesion or adhesion.

The expression "degree of crystallinity in polar phase" is understood to mean the proportion by weight of crystals being in a polar phase, with respect to the total weight of fibers. It can be obtained by multiplying the degree of crystallinity of the fiber by the relative content of polar crystalline phase(s) within the crystalline phases.

The "degree of crystallinity" can be measured by wide angle X-ray scattering (WAXS). A spectrum of the scattered intensity as a function of the diffraction angle is thus obtained. This spectrum makes it possible to identify the presence of crystals, when peaks are visible on the spectrum in addition to the amorphous halo. In the spectrum, it is possible to measure the area of the crystalline peaks (denoted CA) and the area of the amorphous halo(denoted HA). The proportion by weight of crystalline phase in the fiber is then calculated by the ratio:

(CA)/(CA+HA).

Alternatively, a method for rapidly estimating the degree of crystallinity is to measure the enthalpy of fusion of the fibers ($\Delta H$) by Differential Scanning calorimetry (DSC) in first heating at a temperature gradient of 10° C./min. The proportion by weight of crystalline phase in the fiber is then estimated by the ratio:($\Delta Hm+\Delta Hc$)/$\Delta H100\%$, in which $\Delta Hm$ is the enthalpy of fusion, $\Delta Hc$ is the enthalpy associated with the Curie transition and $\Delta H100\%$ is the theoretical enthalpy of a 100% crystalline sample.

The relative content of polar crystalline phase(s) in the crystalline phases corresponds in particular to the proportion by weight of beta, gamma and delta phases in the crystalline phases. It can be determined by various techniques, such as Differential Scanning calorimetry (DSC), X-ray Spectroscopy or Fourier Transform Infrared Spectroscopy (FTIR). As the beta phase is the most polar phase and/or it being possible for the gamma and delta phases to be in minor amounts or not present at all, the relative content of polar crystalline phase(s) in the crystalline phases can generally be simplified, more or less approximately, as being solely the content of beta phase in the crystalline phases. In addition, the state of the art shows that the crystalline phases of fibers obtained by electrospinning of PVDF are virtually exclusively alpha and beta. In order to estimate the relative proportion, F($\beta$), of beta phase with respect to the crystalline phases in a sample from its infrared spectrum, the relative intensities and the coefficients of absorption of bands characteristic of the two phases are used. F($\beta$) is given by the relationship:

$$F(\beta) = \frac{x_\beta}{x_\alpha + x_\beta} = \frac{A_\beta}{\left(\frac{K_\beta}{K_\alpha}\right)A_\alpha + A_\beta} \qquad \text{[Math 4]}$$

in which:

$X_\alpha$ and $X_\beta$ are the relative fractions of alpha and beta phase in the crystalline phases, $A_\alpha$ is the absorbance of a band characteristic of the alpha phase, for example at 766 cm$^{-1}$, $A_\beta$ is the absorbance of a band characteristic of the beta phase, for example at 840 cm$^{-1}$, $K_\alpha$ is the coefficient of absorption corresponding to the wavelength characteristic of the alpha phase (for 766 cm$^{-1}$, $K_\alpha$ is estimated at $6.1\times10^4$), $K_\beta$ is the coefficient of absorption corresponding to the wavelength characteristic of the beta phase (for 840 cm$^{-1}$, $K_\beta$ is estimated at $7.7\times10^4$).

The term "copolymer" is understood to denote, in the broad sense, a polymer resulting from the copolymerization of at least two types of chemically different monomers, called comonomers. A copolymer, in the broad sense, is thus formed of at least two repeat units. It can, for example, be formed of two, three or four repeat units. A copolymer, in the strict sense, is formed of exactly two repeat units, such as, for example, P(VDF-TrFE).

The term "mixture of polymers" is understood to denote a macroscopically homogeneous composition of polymers. The term encompasses mixtures of compatible polymers, that is to say miscible polymers, the mixture exhibiting a glass transition temperature intermediate to those of these polymers considered individually. The term also encompasses such compositions composed of mutually immiscible phases dispersed at the micrometric scale.

The term "melting point" is understood to denote the temperature at which an at least partially crystallized polymer changes to a viscous liquid state. The melting point can be measured by differential scanning calorimetry (DSC) according to the standard NF EN ISO 11357-3:2018, in second heating, using a heating rate of 10° C./min.

In the present patent application, the singular forms "a (n)", respectively "the", mean by default "at least one" and respectively "said at least one"(the latter formulations are not always used so as to lighten certain turns of phrase), unless otherwise indicated.

In all the ranges set out in the present patent application, the limits are included, unless otherwise mentioned.

According to certain embodiments, the fibers of composition C1 have a degree of crystallinity in polar phase(s) of at least 65% and preferentially of at least 75%, or of at least 80%, or of at least 85%, or of at least 90%, or of at least 95%, or of at least 96%, or of at least 97%, or of at least 98%, or of at least 99%, by weight, with respect to their total weight.

Preferentially, the fibers of composition C1 have a degree of crystallinity in beta phase of at least 65% and preferentially of at least 75%, or of at least 80%, or of at least 85%, or of at least 90%, or of at least 95%, or of at least 96%, or of at least 97%, or of at least 98%, or of at least 99%, by weight, with respect to their total weight.

Advantageously, the fibers of composition C1 have a degree of crystallinity of at least 60%, or of at least 65%, or of at least 70%, or of at least 75%, or of at least 80%, or of at least 85%, or of at least 90%, or of at least 95%, or of at least 99%. Advantageously, the fibers of composition C1 have a relative content of polar crystalline phase(s), in particular of beta phase, of at least 85%, or of at least 90%, or of at least 95%, or of at least 99%.

The degree of crystallinity and/or the relative content of polar crystalline phase(s) can be increased in various ways, as presented in embodiments below.

According to certain embodiments, the polymer P1 is chosen from the group consisting of: a homopolymer of VDF; a copolymer having a repeat unit resulting from VDF and at least one repeat unit resulting from a monomer other than VDF, the other monomer being chosen from the list consisting of: vinyl fluoride (VF), tetrafluoroethylene (TFE), trifluoroethylene (TrFE), a chlorofluoroethylene (CFE), a chlorodifluoroethylene, chlorotrifluoroethylene (CTFE), dichlorodifluoroethylene, a trichlorofluoroethylene, hexafluoropropylene (HFP), a trifluoropropene, a tetrafluoropropene, a chlorotrifluoropropene, hexafluoroisobutylene, perfluorobutylethylene, a pentafluoropropene, a perfluoroether, in particular a perfluoroalkyl vinyl ether, ethylene, an acrylic monomer, a methacrylic monomer and their mixture; and a mixture of abovementioned homopolymer(s) and copolymer(s).

It is clearly understood that all the geometric isomers of the aforementioned fluorinated compounds are included in the above terminologies, such as: 1,1-chlorofluoroethylene (1,1-CFE), 1,2-chlorofluoroethylene (1,2-CFE), 1,2-dichloro-1,2-difluoroethylene, 1,1-dichloro-1,1-difluoroethylene and 1,1,2-trichloro-2-fluoroethylene, 3,3,3-trifluoropropene, 2-chloro-3,3,3-trifluoropropene (1233xf), 1-chloro-3,3,3-trifluoropropene (1233zd), 1,3,3,3-tetrafluoropropene, 2,3,3,3-tetrafluoropropene (or 1234yf), 3-chloro-2,3,3-trifluoropropene (or 1233yf), 3-chloro-3,3,3-trifluoropropene, 1,1,3,3,3-pentafluoropropene or 1,2,3,3,3-pentafluoropropene.

Mention may be made, among the perfluoroalkyl vinyl ethers, of those of general formula: $R_f$—O—CF=CF$_2$, $R_f$ being an alkyl group, preferably a $C_1$ to $C_4$ alkyl group, and for example methyl vinyl ether (MVE) or isopropyl vinyl ether (PVE). Mention may be made, among the monomers of acrylic or methacrylic type, of: acrylic acid, methacrylic acid, 2-(trifluoromethyl) acrylic acid, hydroxyethyl acrylate, hydroxyethyl methacrylate, hydroxypropyl acrylate, hydroxypropyl methacrylate, hydroxyethylhexyl acrylate, hydroxyethylhexyl methacrylate and their mixture.

In the embodiments where P1 comprises a copolymer, the latter is advantageously a random copolymer.

In preferred embodiments, the polymer P1 is a PVDF, a P(VDF-HFP), a P(VDF-TFE), a P(VDF-TrFE) or their mixture.

According to certain embodiments, said at least one polymer P1 consists of PVDF. This includes mixtures of PVDFs, in particular of PVDFs having different weight-average molecular weights.

According to certain embodiments, said at least one polymer P1 consists of a P(VDF-HFP), or of a P(VDF-TFE), or of a P(VDF-TrFE). This includes mixtures of copolymers, for example P(VDF-TrFE), having different ratios of monomers and/or different weight-average molecular weights.

According to certain embodiments, said at least one polymer P1 is a mixture consisting of:

a PVDF, a copolymer chosen from: P(VDF-HFP), P(VDF-TFE) and P(VDF-TrFE);

the proportion by weight of the PVDF, with respect to that of the copolymer, ranging from 1:99 to 99:1.

Preferably, the proportion by weight of PVDF, with respect to that of the copolymer, is from 10:90 to 90:10. More preferably, the proportion by weight of PVDF, with respect to that of the copolymer, is from 25:75 to 75:25.

The P(VDF-HFP) advantageously has a molar proportion of repeat units resulting from HFP of 15% to 35%.

The P(VDF-TFE) advantageously has a molar proportion of repeat units resulting from TFE of 8% to 30%, preferentially of 15% to 28%, more preferentially of 18% to 25% and extremely preferably of 20% to 22%, with respect to the total number of moles of units resulting from VDF and TFE. The P(VDF-TrFE) advantageously has a molar proportion of repeat units resulting from TrFE of 15% to 50%, preferentially of 16% to 35%, more preferentially of 17% to 32% and extremely preferably of 18% to 28%, with respect to the total number of moles of units resulting from VDF and TrFE. According to certain embodiments, the polymer P1 has a melt flow index at 230° C., under a load of 12.5 kg, of 0.1 to 15 g/10 minutes, preferentially of 1 to 10 g/10 minutes and more preferably of 3 to 8 g/10 minutes, as measured according to the standard ASTM D1238-13.

The composition C1 comprises at least 50% by weight of the polymer P1, with respect to the total weight of C1. Sufficiently high proportions of polymer P1 in C1 make it possible to guarantee good crystallization of C1 in predominantly ferroelectric form. According to certain embodiments, the composition C1 comprises at least 60%, or at least 70%, or at least 80%, or at least 90%, or at least 95%, or at least 97.5%, or at least 99.0%, of the polymer P1. According to certain embodiments, the composition C1 can additionally comprise at least one polymer P1' other than the polymer P1. The polymer P1' can in particular be chosen from the list consisting of: a poly(methyl methacrylate) (PMMA), a poly(ethyl methacrylate) (PEMA), a poly(methyl acrylate) (PMA), a poly(ethyl acrylate) (PEA), a poly(vinyl acetate) (PVAc), a poly(vinyl methyl ketone) (PVMK), a thermoplastic polyurethane (TPU), a thermoplastic starch, copolymers deriving therefrom, and their mixtures. According to certain embodiments, the composition C1 comprises a polymer P1 and a polymer P1', P1 consisting of a PVDF and P1' consisting of a PMMA. Advantageously, the proportion by weight of PMMA, with respect to the sum of the weights of PMMA and PVDF, is advantageously from 15% to 40%, preferentially from 16% to 30% and more preferentially still from 17% to 23%. The addition of PMMA to the PVDF in these proportions makes it possible to significantly increase the degree of crystallinity in beta phase and only affects to a lesser extent the degree of crystallinity.

According to some embodiments, the composition C1 can additionally comprise a certain number of additives. An example of additive is, for example, an additive having a bactericidal or fungicidal effect. The composition C1 preferentially comprises less than 5% by weight, or less than 4% by weight, or less than 3% by weight, or less than 2% by weight, or less than 1% by weight, of additive.

Advantageously, the composition C1 does not comprise an electrical and/or thermal conductive additive, such as carbon nanotubes, graphene or also an organosilicate. This is because such conductive additives can have a negative effect on the stability of the space charges which can participate in the efficiency by induction (electrostatic efficiency) of the membrane. In particular, they are liable to cause premature discharge of the fibers over time or premature discharge in specific environments (for example washing and/or sterilization). Likewise, and advantageously, the composition C1 does not comprise an inorganic ferroelectric particle, such as ferrite particles, or BaTiO₃ particles. Likewise, and advantageously, the composition C1 does not comprise a nanofiller, that is to say a filler having at least one dimension less than or equal to 100 nm. This is because such fillers would be liable to present risks by inhalation to human health.

Alternatively to these embodiments, the composition C1 can consist solely of the polymer P1.

The web generally comprises at least 50% by weight of fibers of composition C1, with respect to the total weight of the web. According to certain embodiments, the web comprises at least 60%, or at least 70%, or at least 80%, or at least 90%, or at least 95%, or at least 97.5%, or at least 99.0%, of fibers of composition C1.

According to certain embodiments, the web can additionally comprise at least one composition C1' different from the composition C1. This other composition can be a composition consisting of at least 50% by weight of at least one other polymer than P1. This other composition can in particular be a composition consisting of at least 60%, or of at least 70%, or of at least 80%, or of at least 90%, or of at least 95%, by weight, of another polymer than P1. The other polymer than P1 can be one of the abovementioned polymers P1'. The polymer other than P1 can also be a polymer chosen from the list consisting of: a polyolefin, such as a polyethylene or a polypropylene, a polyamide (PA 11; PA 12; PA 6; PA 6.6; PA 6.10), a poly(ethylene terephthalate) (PET), a polyaryletherketone, a polyether sulfone, a polymethacrylic ester, a polyacrylic ester, a polyethylene oxide (PEO), a polyethylene glycol (PEG), a polystyrene (PS), a polylactic acid (PLA), a polyacrylic acid (PA), a polyvinyl alcohol (PVA), a polysulfone, a polyacrylonitrile, a polyurethane, a polycaprolactone, a polyimide, a fluoropolymer, such as a PVDF, a P(VDF-HFP), a P(VDF-TFE), a P(VDF-CFE), a P(VDF-TrFE-CFE), a P(VDF-TrFE-CTFE), a polyvinyl fluoride (PVF), a polychlorotrifluoroethylene (PCTFE), a polytetrafluoroethylene (PTFE), a poly(ethylene- co-tetrafluoropropene) (ETFE), a poly(tetrafluoroethylene-co-perfluoropropyl ether) (PFA), a poly(ethylene-co-chlorotrifluoroethylene) (E-CTFE), a poly(tetrafluoroethylene-co-perfluoropropene) (E-CPFP), a polymethyl methacrylate (PMMA), a PMMA copolymer, such as a poly(methyl methacrylate-co-ethyl acrylate) or a PMMA-PS block copolymer, a poly(ethyl methacrylate) (PEMA), a poly(methyl acrylate) (PMA), a poly(ethyl acrylate) (PEA), a poly(vinyl acetate) (PVAc), a poly(vinyl methyl ketone) (PVMK), a thermoplastic polyurethane (TPU), a thermoplastic starch, copolymers deriving therefrom, and their mixtures.

Alternatively to these embodiments, the web can consist solely of fibers of composition C1.

The web fibers advantageously have a median diameter strictly of greater than 100 nm. The diameter of the fibers and their distribution can be estimated by scanning electron microscopy (SEM), counting and analysis by dedicated software.

According to certain embodiments, the median diameter of the fibers of the web is greater than or equal to 150 nm, or greater than or equal to 200 nm, or greater than or equal to 250 nm.

According to certain embodiments, the median diameter of the fibers of the web is less than or equal to 1600 nm, or less than or equal to 1400 nm, or less than or equal to 1200 nm, or less than or equal to 1000 nm, or less than or equal to 800 nm, or less than or equal to 600 nm, or less than or equal to 550 nm, or less than or equal to 500 nm, or less than or equal to 450 nm.

According to certain embodiments, the web comprises less than 1%, preferentially less than 0.5% and more preferably less than 0.1% by number of fibers having a diameter strictly of less than 100 nm. These embodiments are in particular advantageous when the web is intended to be used in a respiratory protection filtering apparatus as a result of the potential risks generated by the breathing of nanometric objects, that is to say objects having at least one size dimension of less than 100 nm.

According to certain embodiments, the median diameter of the fibers of the web can in particular be from 150 nm to 600 nm, preferentially from 200 nm to 500 nm and more preferentially from 250 nm to 450 nm.

According to certain embodiments, the web has a weight per unit area (surface density) of 0.01 g/m² to 3 g/m². The weight per unit area can be estimated by simply weighing a given surface area, for example 200 mm×250 mm, preferably after placing in an oven to ensure the absence of residual solvent. The web preferentially has a weight per unit area of 0.02 g/m² to 1 g/m² and more preferably a weight per unit area of 0.03 g/m² to 0.5 g/m².

According to certain embodiments, the web has a mean thickness of 0.1 μm to 100 μm. The mean thickness can, for example, be estimated using a mechanical micrometer, an optical or laser sensor, or also by optical microscopy or by scanning electron microscopy (SEM). The web preferentially has a mean thickness of 0.2 μm to 10 μm and more preferentially of 0.3 μm to 0.8 μm. According to certain embodiments, the web has a pressure drop of less than or equal to 500 Pa for a nominal air flow of 95 l/min and/or a pressure drop of less than or equal to 100 Pa for a nominal flow of air of 30 l/min (see standard EN149:2001+A1:2009). The web preferentially has a pressure drop of less than or equal to 350 Pa, preferentially of less than or equal to 250 Pa, preferentially of less than or equal to 100 Pa and extremely preferably of less than or equal to 50 Pa for an air flow of 95 l/min. The web preferentially has a pressure drop of less than or equal to 75 Pa, preferentially of less than or equal to 50 Pa and extremely preferably of less than or equal to 25 Pa for an air flow of 30 l/min. According to certain embodiments, the membrane has an efficiency of at least 75% for aerosols of a nebulized NaCl solution (particle size ranging from 50 nm to 500 nm). The membrane can in particular have an efficiency of at least 80%, or of at least 85%, or of at least 90%, or of at least 94%, or of at least 95%, or of at least 96%, or of at least 99%, or of at least 99.90%, or of at least 99.95%. According to certain embodiments, the units resulting from VDF in the polymer P1 result, at least in part, from a biobased VDF. The term "biobased" means "resulting from biomass". This makes it possible to improve the ecological footprint of the membrane. Biobased VDF can be characterized by a content of renewable carbon, that is to say of carbon of natural origin originating from a biomaterial or from biomass, of at least 1 atom %, as determined by the content of 14C according to the standard NF EN 16640. The term "renewable carbon" indicates that the carbon is of natural origin and originates from a bioma- terial (or from biomass), as indicated below. According to certain embodiments, the biocarbon content can be greater than 5%, preferably greater than 10%, preferably greater than 25%, preferably greater than or equal to 33%, prefer- ably greater than 50%, preferably greater than or equal to 66%, preferably greater than 75%, preferably greater than 90%, preferably greater than 95%, preferably greater than 98%, preferably greater than 99%, advantageously equal to 100%.

Process

A process for manufacturing a web according to the invention comprises a stage of formation of the web by electrospinning at least one composition C1. Electrospin- ning is a well-known electrohydrodynamic process which makes it possible to manufacture small-sized polymer fibers, in particular fibers with a diameter ranging from a few tens of nanometers to several hundred nanometers. When a sufficiently high electrical voltage is applied to a droplet of polymer in the molten state or in solution, the droplet becomes charged. An electrostatic repulsive force then opposes the surface tension of the droplet, forcing the latter to stretch, until it forms a cone, called a "Taylor cone". An electrically charged jet is ejected from the tip of the Taylor cone and then accelerated by an electric field. The jet extends in the direction of the electric field and thins as it travels toward a grounded collecting electrode. The exten- sion of the jet and its thinning are accompanied by a solidification of fibers of polymers. The fibers resulting from the jet are recovered directly on the collecting electrode, or advantageously on a substrate placed in front of the collect- ing electrode, at the end of their journey.

The electrospinning can in particular be "with needle" or "without needle", as explained diagrammatically by FIGS. 1 and 2 below. In order to make the explanations easier, it will be considered subsequently, for purely educational purposes and without any limitation, that the web consists of a single composition C1, itself consisting of the polymer P1.

FIG. 1 exhibits the diagram of a "with needle" electro- spinning installation, generally used in the laboratory. The installation 10 comprises a syringe 11 comprising a solution 12 of polymer P1. The syringe is generally fitted with a pump (not represented) making it possible to control the flow rate of solution exiting from it. Facing the syringe is a collecting electrode 14 connected to ground. A high-voltage generator 13 between the syringe and the collecting elec- trode 14 makes it possible to generate an electric field. A filament 15, subjected to the electric field, is ejected from the syringe 11, and is preferably deposited on a substrate 16, different from the collecting electrode 14.

FIG. 2 exhibits the diagram of a "without needle" elec- trospinning installation, generally advantageous for making possible greater productivity (amount deposited for a given time), over a larger surface area. The installation 20 com- prises an open bath 21 comprising the polymer P1 in a fluid state (in solution, in the molten state, and the like) and a rotating electrode 22 dipping in the bath 21. The rotational speed of the electrode makes it possible to adapt the flow of composition C1 being ejected from the bath. Facing the bath 21 and the rotating electrode 22 is a collecting electrode 24 connected to ground. A high-voltage generator 23 between the bath 21/rotating electrode 22 and the collecting electrode 24 makes it possible to generate an electric field. Filaments 25, subjected to the electric field, are ejected from the bath 21. They are preferably deposited on a substrate 26, different from the collecting electrode 24. The substrate 26 can in particular be a rolling belt.

Several parameters of the process can be adjusted so as to obtain a web with the advantageous properties, in particular having a good filtration efficiency and/or a low pressure drop and/or few fibers with a size of less than 100 nm. The parameters are in particular adjusted so as to obtain fibers of desired size, with a substantially homogeneous appearance and minimizing the presence of beads.

The polymer P1 can be dissolved in different solvents or mixtures of solvents ("liquid vehicle").

According to a first embodiment, the liquid vehicle does not comprise dimethyl sulfoxide (DMSO) and comprises, consists essentially of or consists of: at least 50% by weight of a (first) liquid having a Hansen solubility parameter op of 7 $MPa^{1/2}$ to 20 $MPa^{1/2}$ and a boiling point of greater than 100° C.

According to certain alternative forms, the (first) liquid has a Hansen solubility parameter $\delta p$ of 15 $MPa^{1/2}$ to 20 $MPa^{1/2}$, preferentially of 15 $MPa^{1/2}$ to 18 $MPa^{1/2}$. The first liquid can in particular consist of gamma-butyrolactone, propylene carbonate or their mixture. This alternative form is particularly suitable when the fluoropolymer comprises a PVDF or consists of a PVDF.

According to other alternative forms, the (first) liquid has a Hansen solubility parameter op of 8 $MPa^{1/2}$ to 15 $MPa^{1/2}$, preferentially of 10 $MPa^{1/2}$ to 15 $MPa^{1/2}$. The first liquid can in particular consist of cyclopentanone, dimethyl phthalate, ethyl acetoacetate, triethyl phosphate, ethyl lactate and their mixture. According to the first embodiment, the (first) liquid is chosen from the list consisting of: cyclopentanone, dim- ethyl phthalate, ethyl acetoacetate, triethyl phosphate, ethyl lactate, gamma-butyrolactone, propylene carbonate and their mixture. Preferably, the (first) liquid can be chosen from the list consisting of: cyclopentanone, dimethyl phtha- late, ethyl acetoacetate, triethyl phosphate, ethyl lactate and their mixture.

According to certain embodiments, the (first) liquid con- sists of cyclopentanone. The liquid vehicle of this first embodiment can comprise at least one second liquid, the second liquid having a boiling point of less than or equal to 100° C. The second liquid can in particular be chosen from the list consisting of: acetone, ethyl acetate, 2-butanone, water and their mixture. Advantageously, the second liquid consists of ethyl acetate or of a mixture of ethyl acetate and water.

According to certain embodiments, the liquid vehicle comprises water, the water constituting up to 5% by weight, preferentially up to 3% by weight, of the liquid vehicle.

According to certain embodiments, the liquid vehicle consists of said at least one first liquid and of said at least one second liquid.

According to certain embodiments, the proportion by weight of first liquid, with respect to the second liquid, is from 20:80 to 80:20 and preferentially from 50:50 to 75:25.

According to a second embodiment, the vehicle com- prises: at least 15% by weight of dimethyl sulfoxide (DMSO), with respect to the total weight of liquid vehicle, and at least one second liquid, the second liquid having a Hansen solubility parameter op of 7 $MPa^{1/2}$ to 15 $MPa^{1/2}$ and a boiling point strictly of greater than 100° C.

According to certain embodiments, the DMSO represents at least 20%, preferentially at least 25% and more preferentially at least 30% by weight of the total weight of the liquid vehicle.

According to certain embodiments, the second liquid represents at least 10% by weight of the total weight of the liquid vehicle.

According to certain embodiments, the second liquid has a Hansen solubility parameter Op of greater than or equal to 8 MPa$^{1/2}$, preferentially of greater than or equal to 9 MPa$^{1/2}$ and extremely preferably of greater than or equal to 10 MPa$^{1/2}$.

According to certain embodiments, the second liquid is chosen from the list consisting of: cyclopentanone, dimethyl phthalate, ethyl acetoacetate, triethyl phosphate, ethyl lactate and their mixture.

According to certain embodiments, the second liquid consists of cyclopentanone.

According to certain embodiments, the ratio by weight of DMSO, with respect to the second liquid, is then advantageously from 40:60 to 60:40.

According to certain embodiments, the liquid vehicle consists of DMSO and of said at least one second liquid. The ratio by weight of DMSO, with respect to the second liquid, is then advantageously from 40:60 to 60:40.

According to certain embodiments, the liquid vehicle comprises at least one third liquid, the third liquid having a boiling point of less than or equal to 100° C. The third liquid advantageously represents from 5% to 60% by weight, with respect to the total weight of the liquid vehicle.

According to certain embodiments, the third liquid is chosen from the list consisting of: acetone, ethyl acetate, 2-butanone, water and their mixture.

According to certain embodiments, the third liquid consists of ethyl acetate or a mixture of water and ethyl acetate.

According to certain embodiments, the third liquid comprises water, the water constituting up to 5% by weight, preferentially up to 3% by weight, of the liquid vehicle.

According to certain embodiments, the ratio by weight of the sum of the weights of the DMSO and of the second liquid, with respect to the weight of the third liquid, is advantageously from 20:80 to 80:20, preferentially from 40:60 to 60:40. According to certain embodiments, the liquid vehicle consists of DMSO, of said at least one second liquid and of said at least one third liquid. The ratio by weight of the sum of the weights of the DMSO and of the second liquid, with respect to the weight of the third liquid, is advantageously from 20:80 to 80:20, preferentially from 40:60 to 60:40.

Advantageously, none of the following solvents is used in the composition of the liquid vehicle to dissolve the polymer P1, as a result of their CMR (carcinogenic, mutagenic or toxic to reproduction) risk: N,N-dimethylformamide (DMF), N,N-dimethylacetamide (DMAc), tetrahydrofuran (THF), tetramethylurea, trimethyl phosphate and N-methyl-2-pyrrolidone.

According to certain embodiments, the polymer P1 is dissolved in a DMSO/cyclopentanone/ethyl acetate liquid vehicle. Acetone and ethyl acetate make it possible in particular to render the mixtures more volatile and they ensure good crystallization of the fibers.

The concentration of the polymer P1 in one of the abovementioned solvents or their mixture is of between a minimum value and a maximum value, below or beyond which the electrospinning no longer substantially forms filament but also beads. Generally, the amount of polymer P1 in one of the abovementioned solvents or their mixture represents from 3% to 30% by weight, preferentially from 6% to 20% by weight and extremely preferably from 9% to 12% by weight of the total weight of solution.

The polymer P1 generally has a weight-average molecular weight chosen between a minimum value and a maximum value. This is because an excessively low molecular weight leads to the presence of unwanted beads during the electrospinning. An excessively high molecular weight tends to produce fibers which are too large in diameter. The polymer P1 generally has a weight-average molecular weight ranging from 100 000 g/mol to 2 000 000 g/mol. Preferably, it has a weight-average molecular weight of 300 000 g/mol to 1 500 000 g/mol and extremely preferably of 400 000 g/mol to 700 000 g/mol. For a polymer P1 of given molecular weight, in a given solvent or mixture of solvents, the concentration of P1 is necessarily greater than the critical entanglement concentration.

The viscosity of the solution of polymer P1, measured by a Brookfield viscometer at 25° C., is generally from 50 to 300 cP. Preferably, the viscosity of the solution is from 75 to 265 cP and extremely preferably from 80 to 150 cP. According to certain embodiments, the solution can comprise an additive making it possible to improve the processability of the filament to be electrospun. The additive can in particular be an additive making it possible to modulate certain electrohydrodynamic properties of the solution. The proportion by weight of additive generally does not exceed 5% of the total weight of the solution. The additive can in particular be water. Water has the advantage of increasing the conductivity of the solution and of evaporating during the electrospinning stage.

The additive can also be a salt. Mention may be made, for example, of NaCl and LiCl or also ammonium salts, such as: TBAC(tetrabutylammonium chloride), TEAC(tetraethylammonium chloride) or TEAB(tetraethylammonium bromide). These salts can advantageously be removed, at least in part, by washing, in particular by washing with water, after formation of the fibers by electrospinning.

Equipment parameters, such as for the devices used in the installations represented in FIGS. 1 and 2, can also be adjusted:

the interelectrode voltage: the latter can generally be adjusted to a value of 5 kV to 40 kV; preferably the interelectrode voltage is chosen so as to be as low as possible so as to limit the energy consumption of the process and to prevent as much as possible any risk of 9 kV to 25 kV and extremely preferably of 10 kV to 20 KV;

the distance between the zone for ejection of the polymer and the substrate:

this distance is generally adjusted to from 5 cm to 30 cm and preferably from 10 cm to 20 cm;

the flow rate for ejection of polymer P1: this flow rate is advantageously chosen so as to be as high as possible depending on the type of equipment (syringe 11 or rotating electrode 22 dipping in the bath 21);

the temperature of the medium in which the filament of polymer P1 being formed is intended to move: this directly influences the temperature of evaporation of the solvent from the solution; preferentially, this temperature is close to ambient temperature. It can in particular be from 10° C. to 80° C., preferentially from 20° C. to 60° C. and more preferably from 25° C. to 45° C.

the relative humidity in which the filament of polymer P1 being formed is intended to move; preferentially, this humidity is from 20% to 60% at the temperature of the medium.

or other specific conditions, for example forced air convection to promote the evaporation of the solvent.

The web formed by electrospinning does not necessarily require an additional stage of polarization since, as a result of the strong electric field exerted, the fibers are generally in a sufficiently polarized state after electrospinning. The web formed by electrospinning can undergo, after its formation, a stage of annealing at a temperature lower than the melting point of the polymer and then be cooled to ambient temperature (25° C.). This annealing stage makes it possible to optionally evaporate the residual solvent and to optionally increase the crystallinity, and thus enhance the ferroelectric properties, of P1. The annealing stage will usually be followed by a stage of polarization, by contact or by corona.

Membrane

The web according to the invention can be sufficiently thick by itself alone to form a membrane suitable for the filtration of nano- and/or submicron aerosols. Conversely, a membrane for the filtration of nano- and/or submicron aerosols according to the invention can comprise:

at least one web according to the invention; and a porous support layer supporting said at least one web.

According to certain embodiments, the web has a weight per unit area of 0.01 g/m² to 3 g/m². The web preferentially has a weight per unit area of 0.02 g/m² to 1 g/m² and more preferably a weight per unit area of 0.03 g/m² to 0.5 g/m². According to certain embodiments, the web has a mean thickness of 0.1 μm to 100 μm. The web preferentially has a mean thickness of 0.2 μm to 10 μm and more preferentially of 0.3 μm to 0.8 μm.

The support layer makes it possible in particular to provide the good mechanical strength of the membrane. The support layer can be a woven or nonwoven set of fibers.

Advantageously, the support layer has a low pressure drop.

According to certain embodiments, in particular when the web is implemented by electrospinning, the support layer can be the substrate onto which the web has been electrospun.

According to certain embodiments, the support layer can be a nonwoven set of thermoplastic fibers. The support layer can in particular be a nonwoven set of fibers chosen from: polyolefins, such as a polyethylene (PE) or a polypropylene (PP), polyesters, such as a poly(ethylene terephthalate) (PET), a poly(butylene terephthalate) (PBT) or also a poly(ethylene naphthalate) (PEN), polyamides or copolyamides, such as a PA 11, a PA 12, a PA 6, a PA 6.6 or a PA 6.10, a polyacrylonitrile (PAN), fluoropolymers, such as a polyvinylidene fluoride (PVDF), a fluorinated ethylene propylene (FEP) or a polytetrafluoroethylene (PTFE), and their mixture.

According to certain embodiments, the support layer is liable to be obtained by a meltblown process or by a spunbond process. A meltblown process generally makes it possible to obtain fibers having a diameter ranging from 0.5 μm to 10 μm. A spunbond process generally makes it possible to obtain fibers having a diameter ranging from 10 μm to 50 μm and is generally less expensive to carry out than a meltblown process.

According to certain embodiments, the support layer has a weight per unit area of 5 g/m² to 100 g/m², preferentially of 10 g/m² to 50 g/m² and extremely preferably of 15 g/m² to 40 g/m².

According to specific embodiments, a membrane comprises one or more webs according to the invention, for example essentially consisting, or consisting, of PVDF fibers or of fibers consisting of a mixture of PVDF and: P(VDF-HFP) or P(VDF-TFE) or P(VDF-TrFE), or also fibers consisting of a mixture of PVDF and PMMA. The web(s) are obtained by electrospinning and have a weight per unit area of 0.02 g/m² to 1 g/m². The substrate can in particular be a PVDF, a PP or also a PET obtained by melt blowing and having a weight per unit area of 10 g/m² to 50 g/m².

FIG. 3 exhibits a multilayer membrane 30 consisting of a support layer 31 and of a single web 32.

FIG. 4 exhibits a multilayer membrane 40 consisting of a support layer 41 covered on each side ("sandwiched") respectively with a web 42 and with a web 43. The webs 42 and 43 can be identical or, on the contrary, different, in particular exhibit a different composition and/or a different weight per unit area and/or a different thickness. For example, the web 42 can have the same chemical composition as the web 43 but exhibit a different weight per unit area and/or a different thickness.

FIG. 5 exhibits a multilayer membrane 50 consisting of a support layer 51 successively covered with three webs 52, 53 and 54 according to the invention. The webs 52, 53 and 54 can be identical or, on the contrary, different, in particular exhibit a different composition and/or a different weight per unit area and/or a different thickness.

Device for the Filtration of Nano- and/or Submicron Aerosols from the Air

The web and/or the membrane according to the invention can constitute a filter and/or form part of a multilayer assembly constituting a filter, constituting or forming part of a device for the filtration of nano- and/or submicron aerosols from the air.

According to certain embodiments, the device for the filtration of nano- and/or submicron aerosols from the air is a respiratory protection filtering apparatus. There exist many different designs of respiratory protection apparatuses, well known to a person skilled in the art (INERIS publication, ED 6106, Respiratory protection apparatuses, August 2019-ISBN 978-2-7389-2503-9).

The respiratory protection apparatus can in particular be a filtering half-mask, a half-mask comprising a filter or a mask comprising a filter. The respiratory protection apparatus can be free ventilation or assisted ventilation. According to preferred embodiments of the invention, the respiratory protection apparatus is free ventilation. The respiratory protection apparatus can in particular be a filtering half-mask as presented below. The breathing apparatus can in particular be a mask for medical use (see standard EN 14683) or a mask of FFP type (see standard EN 149).

According to certain embodiments, the filter comprising the web and/or the membrane makes possible only the filtration of nano- and/or submicron aerosols from the air.

According to certain embodiments, the filter comprising the web and/or the membrane is a combined filter making possible the filtration of nano- and/or submicron aerosols and antigas filtration.

FIG. 6 represents a filtering half-mask 60 comprising a filter 61, means for fixing the filter to the face, and in particular a nose bar 62, an elastic strap 63, and also an exhalation valve 64 (optional in certain configurations).

With reference to FIG. 7, the filter 61 consists of three layers: two outer layers 72 and 73, one suitable for being and intended to be in contact with the face of a user, the other suitable for being and intended to be in contact with the external environment, and also a middle layer consisting of the membrane 30.

Washing/Sterilization Process

The web and/or the membrane according to the invention can advantageously be washed and/or sterilized so as to be able to be reused. They can preferentially be washed/sterilized at least 5 times, preferentially at least 10 times, more preferentially at least 20 times, more preferentially at least 30 times and extremely preferably at least 50 times.

Washing can in particular be carried out with water, preferentially with hot water. Sterilization methods include:
a chemical treatment, with a chemical substance in the liquid state or in the vapor state;
a UV-C treatment;
a heat treatment; and
a combination of treatments.

An example of chemical treatment is a treatment with hydrogen peroxide (HPV/HPVP), VHP, HPGP, iHP and aHP.

The UV-C treatment is a treatment with radiation having a wavelength ranging from 100 to 280 nm. It makes it possible to sterilize the web and/or the membrane. Advantageously, the UV-C treatment is carried out by a lamp having a radiation peak between 230 nm and 270 nm, in particular in the vicinity of 254 nm. The treatment is generally applied at a dose of 1 J/cm to 120 J/cm, preferentially of 1 J/cm to 50 J/cm.

The heat treatment can be carried out at a temperature generally of greater than or equal to 40° C. for a sufficient period of time, preferentially of less than or equal to 30 minutes and more preferably of less than or equal to 15 minutes. It can in particular be carried out at a temperature of greater than or equal to 50° C., or of greater than or equal to 60° C., or of greater than or equal to 70° C., or of greater than or equal to 80° C.

The heat can be a "dry" heat or a "wet" heat (degree of humidity of greater than 50%).

Apparatuses making it possible to carry out such treatments are in particular heating cabinets, water baths, autoclaves or ovens.

The treatment is to be chosen and to be adapted according to various constraints: nature and strength of the other materials than the web which have to undergo the treatment, use in a hospital or domestic setting, and the like. As such, it is recommended for the user of a washable and/or sterilizable respiratory protection apparatus to be well informed by carefully reading the manufacturer's instructions and also the recommendations of official standards and/or health bodies, it being possible for changes to have to be made to these recommendations over time. To our knowledge, domestic ovens and microwave ovens for domestic use are not, at the time of writing of the present patent application, part of the washing/sterilization methods recommended for masks for domestic use by the main official standards and/or health bodies, as a result in particular of the existing lack of data and of the potential risk of biological/chemical contamination of the ovens. The ANSM [French National Agency for the Safety of Medicines and Health Products], in its advice of Mar. 25, 2020, revised on Apr. 21, 2020, recommends for example for fabric masks for nonsanitary use, provided in the context of the COVID epidemic, for treatment at home: i) a machine wash with a detergent suitable for the fabric, the cycle of which will comprise at least a 30-minute plateau at 60° C., and ii) mechanical drying or conventional drying, followed in both cases by steam ironing at a temperature compatible with the composition of the mask.

The invention claimed is:

1. A nonwoven web comprising a multiplicity of fibers of composition C1, the composition C1 comprising at least 50% by weight of at least one polymer P1 comprising a repeating unit of vinylidene fluoride (VDF),
said fibers of composition C1 having a degree of crystallinity in polar phase(s), of at least 65% by weight, with respect to their total weight,
the web comprising less than 1% by number of fibers having a diameter strictly of less than 100 nm,
wherein the web is produced by a process comprising electrospinning,
wherein the web is configured for filtration of nano and/or submicron aerosols.

2. The web as claimed in claim 1, in which said fibers of composition C1 have a degree of crystallinity in polar phase(s), of at least 75%, with respect to their total weight.

3. The web as claimed in claim 1, in which the polymer P1 is chosen from the group consisting of: a homopolymer of VDF; a copolymer having a repeat unit resulting from VDF and at least one repeat unit resulting from a monomer other than VDF, the other monomer being chosen from the list consisting of: vinyl fluoride (VF), tetrafluoroethylene (TFE), trifluoroethylene (TrFE), a chlorofluoroethylene (CFE), a chlorodifluoroethylene, chlorotrifluoroethylene (CTFE), dichlorodifluoroethylene, a trichlorofluoroethylene, hexafluoropropylene (HFP), a trifluoropropene, a tetrafluoropropene, a chlorotrifluoropropene, hexafluoroisobutylene, perfluorobutylethylene, a pentafluoropropene, a perfluoroether, in particular a perfluoroalkyl vinyl ether, ethylene, an acrylic monomer, a methacrylic monomer and their mixture; and a mixture of homopolymer(s) and copolymer(s).

4. The web as claimed in claim 1, in which the polymer P1 is a PVDF, a P(VDF-HFP), a P(VDF-TFE), a P(VDF-TrFE) or their mixture.

5. The web as claimed in claim 1, in which said at least one polymer P1 is a mixture consisting of:
a PVDF,
a copolymer chosen from: P(VDF-HFP), P(VDF-TFE) and P(VDF-TrFE);
the proportion by weight of PVDF, with respect to that of the copolymer, ranging from 1:99 to 99:1.

6. The web as claimed in claim 1, in which the polymer P1 represents at least 60%, by weight, of the composition C1.

7. The web as claimed in claim 1, in which the composition C1 additionally comprises at least one polymer P1' chosen from the list consisting of: a poly(methyl methacrylate) (PMMA), a poly(ethyl methacrylate) (PEMA), a poly (methyl acrylate) (PMA), a poly(ethyl acrylate) (PEA), a poly(vinyl acetate) (PVAc), a poly(vinyl methyl ketone) (PVMK), a thermoplastic polyurethane (TPU), and a thermoplastic starch.

8. The web as claimed in claim 7, in which the polymer P1 consists of a PVDF and the polymer P1' consists of a PMMA, the proportion by weight of P1', with respect to the sum of the weights of the polymers P1 and P1', being from 15% to 40%.

9. The web as claimed in claim 1, consisting of fibers of composition C1.

10. The web as claimed in claim 1, having a weight per unit area of 0.01 g/m² to 3 g/m².

11. The web as claimed in claim 1, wherein the web is free of solvents from the list consisting of: N,N-dimethylformamide (DMF), N,N-dimethylacetamide (DMAc), tetrahydrofuran (THF), tetramethylurea, trimethyl phosphate and N-methyl-2-pyrrolidone.

12. A membrane suitable for the filtration of nano- and/or submicron aerosols comprising:

at least one web as claimed in claim 1, a support layer supporting said web.

13. The membrane as claimed in claim 12, in which said support layer is a nonwoven set of fibers chosen from: polyolefins, polyesters, polyamides or copolyamides, a polyacrylonitrile (PAN), fluoropolymers, and their mixture.

14. A process for the washing/sterilization of a web as claimed in claim 1 comprising a stage of heat treatment carried out at a temperature of 40° C. to 90° C.

15. A process for the washing/sterilization of a membrane as claimed in claim 12 comprising a stage of heat treatment carried out at a temperature of 40° C. to 90° C.

16. The web as claimed in claim 1, comprising less than 0.5% by number of fibers having a diameter strictly of less than 100 nm.

17. The web as claimed in claim 1, comprising less than 0.1% by number of fibers having a diameter strictly of less than 100 nm.

18. The web as claimed in claim 1, wherein the polymer P1 has a weight-average molecular weight ranging from 100,000 g/mol to 2,000,000 g/mol.

19. The web as claimed in claim 1, wherein the polymer P1 has a weight-average molecular weight ranging from 400,000 g/mol to 700,000 g/mol.

\* \* \* \* \*